(12) United States Patent
Wei

(10) Patent No.: US 8,493,750 B2
(45) Date of Patent: Jul. 23, 2013

(54) PIEZOELECTRIC POWER CONVERTER

(75) Inventor: Tao-Chin Wei, Taipei (TW)

(73) Assignees: Midas Wei Trading Co., Ltd., Taipei (TW); Champion Elite Company Limited, Road Town, Tortola (BV)

(*) Notice: Subject to any disclaimer, the term of this patent is extended or adjusted under 35 U.S.C. 154(b) by 764 days.

(21) Appl. No.: 12/578,221

(22) Filed: Oct. 13, 2009

(65) Prior Publication Data
US 2010/0296315 A1 Nov. 25, 2010

(30) Foreign Application Priority Data
May 22, 2009 (TW) ................................ 98117075 A

(51) Int. Cl.
*H02J 1/00* (2006.01)
*H02M 3/00* (2006.01)
*H02M 3/22* (2006.01)

(52) U.S. Cl.
USPC .......................................................... 363/15

(58) Field of Classification Search
USPC ............................. 363/15, 16, 21.02; 310/318
See application file for complete search history.

(56) References Cited

U.S. PATENT DOCUMENTS 3,230,396 A * 1/1966 Boelke .......................... 363/163
5,969,954 A * 10/1999 Zaitsu ............................. 363/16
2007/0013320 A1* 1/2007 Chou et al. ............... 315/209 PZ

* cited by examiner

*Primary Examiner* — Jue Zhang
(74) *Attorney, Agent, or Firm* — Muncy, Geissler, Olds & Lowe, PLLC

(57) ABSTRACT

Disclosed is a piezoelectric power supply converter, wherein, a piezoelectric element is utilized to replace a conventional capacitor, due to characteristic of mechanical resonance of said piezoelectric element, said piezoelectric element may contain higher capacitance than said conventional capacitor, and a parasitic resistance of said piezoelectric element is smaller that that of an ordinary capacitor. Through a resonance between an externally added inductive element and a piezoelectric-capacitor and said resonance of said piezoelectric element itself, said piezoelectric element is capable of transmitting electrical energy efficiently, thus achieving large output power. Therefore, said piezoelectric-capacitor is capable of improving shortcomings of said conventional capacitors of low voltage endurance, large leakage current, and small output power.

9 Claims, 13 Drawing Sheets

PIEZOELECTRIC POWER CONVERTER

BACKGROUND OF THE INVENTION

1. Field of the Invention

The present invention relates to a piezoelectric power supply converter, and in particular to a power supply converter capable of raising its output power by means of piezoelectric elements.

2. The Prior Arts

Nowadays, more and more portable electronic devices are capable of providing various advanced functions, for example, color screen, stereo audio, hyper links, such as GPRS, wireless network, and Bluetooth, and photo & video recording, Contrast to the existing voluminous and cumbersome portable electronic devices, what the consumers require is that, product design has to be not only of compact size, thin profile, light weight, and easy to operate, but the battery must also be able to provide power for enough long period of operation. This requirement of customer has put circuit design engineer into a dilemma: it must be able to provide much more power to the system and more sets of voltages, yet the space occupied by the power supply equipment and the battery of the portable electronic device has to be reduced steadily.

In order to fulfill all these technical requirements, a design engineer must adopt power supply of higher efficiency, however, in a circuit of an ordinary power supply converter, an ordinary capacitor is connected to an inductor in series or in parallel in realizing resonance effect, however, in case that the voltage of an input signal to an ordinary capacitor is overly large, that would cause pretty large leakage current, thus the efficiency of power transmission is not quite satisfactory. In addition, the voltage endurance of the ordinary capacitor is not sufficient, thus operation failure will result in the explosion of a capacitor, and that is liable to lead to hazards of catching fire. Therefore, the functions and performance of convention power supply converter is not quite satisfactory, and it has much room for improvement

SUMMARY OF THE INVENTION

In view of the problems and shortcomings of the prior art, the present invention provides a piezoelectric power supply converter, so as to overcome the problems of the prior art.

A major objective of the present invention is to provide a piezoelectric power supply converter, wherein, simple structure piezoelectric elements are utilized in cooperation of an ordinary transformer, for providing output power of several folds, hereby achieving the results of large power output.

Another objective of the present invention is to provide a piezoelectric power supply converter, wherein, simple structure piezoelectric elements are utilized in replacing ordinary capacitors. Since for a piezoelectric element, its leakage current is small, its voltage endurance is high, without the danger of catching fire induced by overheat, thus its reliability is high, as such, it can be used to solve the problem of fire hazard of the conventional power supply converter due to its low voltage endurance and overheating as caused by the capacitor contained therein. In addition, due to its compact size and thin package profile, the piezoelectric elements have a very good advantage in market competition.

In order to achieve the above-mentioned objective, the present invention provides a piezoelectric power supply converter utilized in converting AC current into DC current, comprising: a transformer, at least a first piezoelectric element, at least a second piezoelectric element. Wherein, the transformer is provided with a primary side and a secondary side, one end of the at least a first piezoelectric element is connected to the primary side, with its other end used to receive a pulse voltage and output the pulse voltage to the primary side. The output of the power supply converter is provided with at least a second piezoelectric element on the secondary side, and is used to output a DC voltage to an external load in performing the operations required.

In addition, the present invention provides another piezoelectric power supply converter utilized in converting an AC current into an AC current, comprising: a transformer, at least a first piezoelectric element. Wherein, the transformer is provided with a primary side and a secondary side, one end of the at least a first piezoelectric element is connected to the primary side, with its other end used to receive a pulse voltage and output the pulse voltage to the primary side, and the secondary side is used to output an AC voltage to an external load in performing the operations required.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
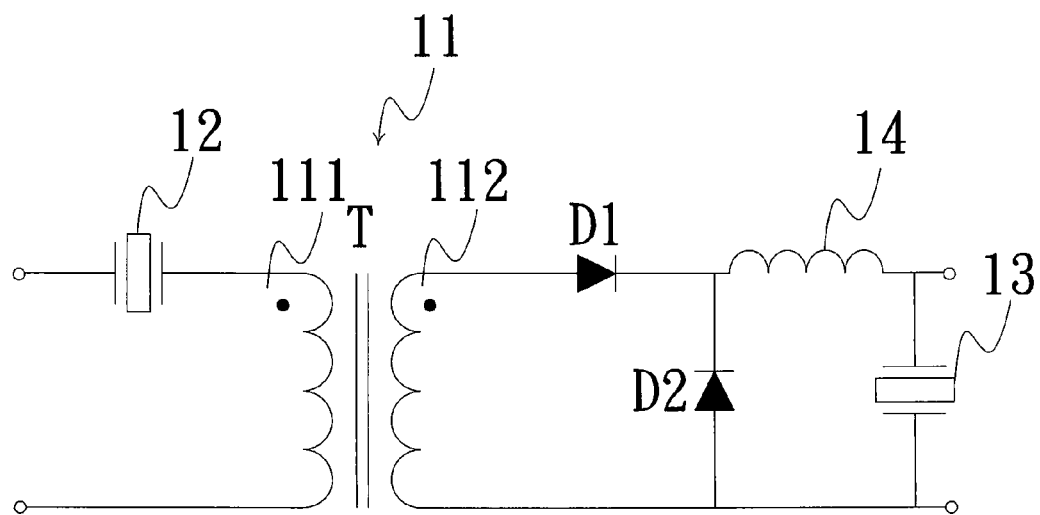
FIG. 1 is a schematic diagram of a piezoelectric power supply converter used in half-bridge input according to a first embodiment of the present invention.
Figure 2A:
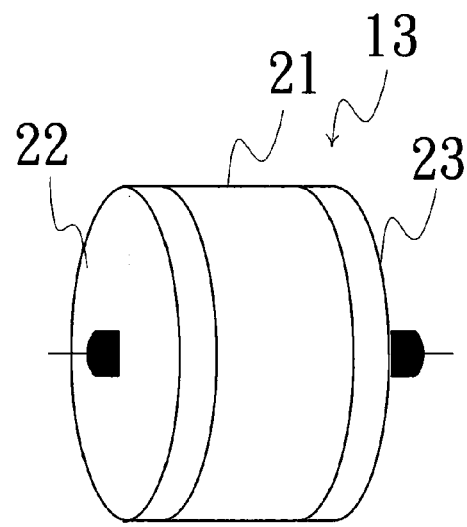
FIG. 2(A) is a schematic diagram of a piezoelectric-oscillator according to a first embodiment of the present invention.

Firstly, refer to FIG. 1 for a schematic diagram of a piezoelectric power supply converter used in half-bridge input according to a first embodiment of the present invention. As shown in FIG. 1, the piezoelectric power supply converter includes: a transformer 11, at least a first piezoelectric element and at least a second piezoelectric element. Wherein, the transformer 11 is provided with a primary side 111 and a secondary side 112. The primary side of the transformer 11 is utilized as an inductor, and it is connected in series with the first piezoelectric element to form a resonance circuit; while the intrinsic capacitance of the first piezoelectric element is utilized as piezoelectric-oscillator 12, and that is used to replace a capacitor in a conventional power supply converter. Wherein, the piezoelectric-oscillator 12 disclosed in the present embodiment as shown in FIG. 2(A), is formed by a substrate 21 of circular plate shape made of piezoelectric material. Of course, its shape can be square shape, rectangular shape, or other geometric shapes; then, two conduction layers 22 and 23 of the same circular shape made of silver paste, copper paste, or nickel paste are formed respectively on the whole or a part of an upper surface and a lower surface of the substrate 21, so as to form two electrodes of piezoelectric-oscillator 12 for guiding the current. Herein, refer to FIG. 2(B) for an equivalent circuit of the piezoelectric-oscillator 12. In this equivalent circuit is shown respectively an equivalent resistor R, an equivalent inductor L, and an equivalent capacitor Ca representing the mechanical characteristic, and a static capacitor Cb representing electrical characteristic. In the present embodiment, the primary side 111 of the transformer 11 is used as an inductor to form a half-bridge resonance circuit. As such, when the resonance circuit resonances, the piezoelectric-oscillator 12 is used to store electrical energy and have piezoelectric characteristics, thus being able to adjust power factor and then output the power. Since the parasitic resistance of a piezoelectric element is smaller than that of an ordinary capacitor, thus it is capable of achieving the effect of large output power. Wherein, the magnitude of a static capacitor Cb representing electrical characteristic is determined by the dimension of the piezoelectric plate; and the equivalent resistor R, the equivalent inductor L, and the equivalent capacitor Ca representing mechanical characteristic are utilized in cooperation with and in assisting the static capacitor Cb in raising the overall equivalent capacitance of the piezoelectric plate. Since the branch of the equivalent resistor R, the equivalent inductor L, and the equivalent capacitor Ca is derived from the structure oscillation, therefore, the smaller distance between their operating frequency and their resonance frequency, the more effective capacitance of the equivalent resistor R, the equivalent inductor L, and the equivalent capacitor Ca can be obtained, and thus the larger entire equivalent capacitance of the piezoelectric element can be raised as well. For an ordinary capacitor, it is only provided with characteristics of static capacitor Cb, yet since a piezoelectric-oscillator 12 is aided by its piezoelectric oscillation, thus it may achieve larger capacitance.

When the value of the equivalent resistor R is very small, the L and Ca in the equivalent circuit can be connected in series to form an equivalent capacitor having a capacitance value of $Ca/(1-\omega^2*Ca*L)$, wherein, $\omega$ represents an operation frequency (rad/s). As such, the value $Ca/(1-\omega)^2*Ca*L)$ is positive when a piezoelectric plate is oscillated at a frequency less than its resonance frequency, and the value $Ca/(1-\omega^2*Ca*L)$ is negative when the piezoelectric plate is oscillated at a frequency higher than its resonance frequency. That means that the L and Ca formed by the oscillation of the piezoelectric structure are able to provide an additional equivalent capacitor when they are oscillated at a frequency less than their resonance frequency. Therefore, when a piezoelectric plate is operated at a frequency less than its resonance frequency, the overall capacitance of a piezoelectric-oscillator 12 is a sum of $Ca/(1-\omega^2*Ca*L)$ of L and Ca plus the capacitance of Cb. Since the more its operation frequency gets closer to its resonance frequency, the larger the value of $Ca/(1-\omega^2*Ca*L)$ can be obtained. As such, when the piezoelectric plate is operated near its resonance frequency, it is able to obtain the largest possible capacitance. For the reasons mentioned above, a piezoelectric-oscillator 12 is able to have a capacitance higher than that of an ordinary capacitor, and a parasitic resistance of the piezoelectric element itself is lower that that of an ordinary capacitor, as such, piezoelectric-oscillator 12 is capable of providing increased output power of several folds, thus raising the energy conversion efficiency.

Figure 2B:
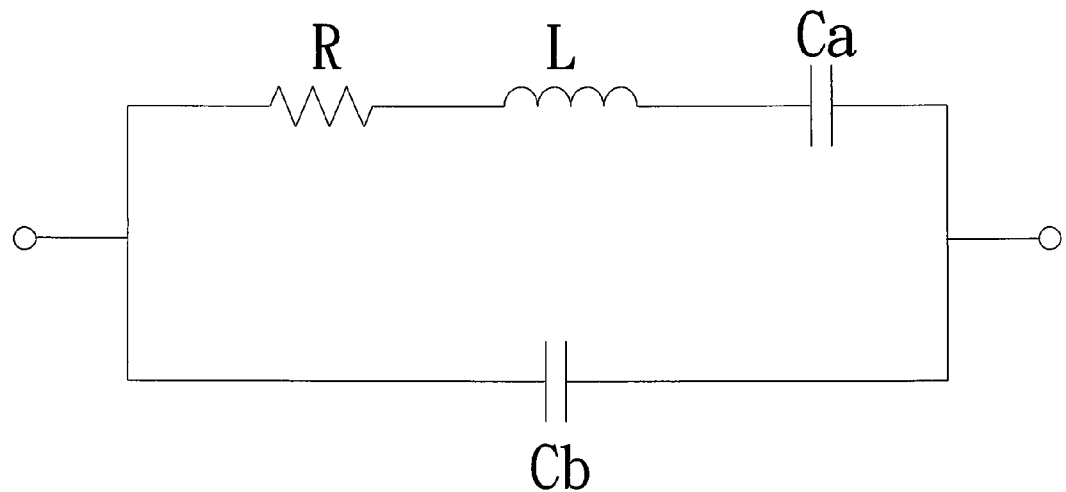
FIG. 2(B) is an equivalent circuit of a piezoelectric-oscillator according to a first embodiment of the present invention.
Figure 2C:
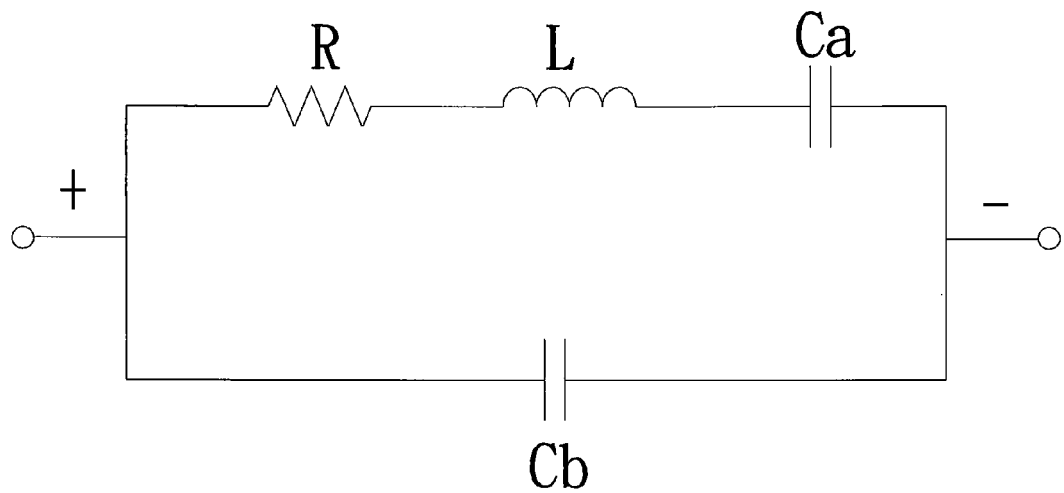
FIG. 2(C) is an equivalent circuit of a piezoelectric-capacitor according to an embodiment of the present invention.

The second piezoelectric element is located on the secondary side 112 of the transformer, the intrinsic capacitance of the second piezoelectric element is utilized as piezoelectric-capacitor 13, and that is used to replace the capacitor in a conventional power supply converter. Wherein, the piezoelectric-capacitor 13 disclosed in the present embodiment as shown in FIG. 2(C) is a piezoelectric-capacitor 13 in an equivalent circuit. In this equivalent circuit is shown an equivalent resistor R, an equivalent inductor L, an equivalent capacitor Ca, and a static capacitor Cb. Piezoelectric-capacitor 13 is located in the DC output voltage, the different between piezoelectric-capacitor 13 and piezoelectric-oscillator 12 is that piezoelectric-capacitor 13 has polarity (positive and negative). The difference between the piezoelectric-capacitor 13 and an ordinary capacitor is that, in the present embodiment, for the piezoelectric-oscillator 12 the piezoelectric-capacitor 13, their leakage currents are small, their voltage endurances are high, without the danger of overheat caused catching fire, thus their reliability is high, as such, they can be used to solve the problem of fire hazard of the conventional power supply converter as resulted from its low voltage endurance and overheating as caused by the capacitor contained therein. In addition, due to its compact size and thin profile, the piezoelectric-oscillator 12 and the piezoelectric-capacitor 13 have very good advantage in market competition.

The secondary side 112 of the transformer 11 is connected to two diodes D1 and D2, and diode D1 and D2 are connected to a filter inductor 14 respectively. The second piezoelectric element is connected to the filter inductor 14 to form an output filter rectifier circuit. Since diode D1 and D2 have the characteristic of single direction electric conduction, they can be used to convert AC voltage of alternatively varying direction and magnitude into DC voltage, as such, they are used for the purpose of rectifying current.

When the input voltage of the primary side 111 is positive, then the induced input voltage of the secondary side 112 is also positive. When the input voltage is at its positive half cycle, the upper end of the secondary side 112 of the transformer 11 is positive, and the lower end is negative, then diode D1 is forward biased, thus current can flow from diode D1 to piezoelectric-capacitor 13 via filter inductor 14 to proceed with charging of piezoelectric-capacitor 13; however, at this time diode D2 is reverse biased, it is in an equivalent open circuit state, thus there is no current flowing through. When the input voltage is at its negative half cycle, the upper end of the secondary side 112 of the transformer 11 is negative, and the lower end is positive, then diode D1 is reverse biased, thus there is no current flowing through, however, at this time diode D2 is forward biased, thus current can flow from diode D2 to piezoelectric-capacitor 13 via filter inductor 14 to proceed with charging of piezoelectric-capacitor 13. Through the above-mentioned operations, piezoelectric-capacitor 13 can be used to output DC voltage to an external load in performing the operations required.

Figure 3:
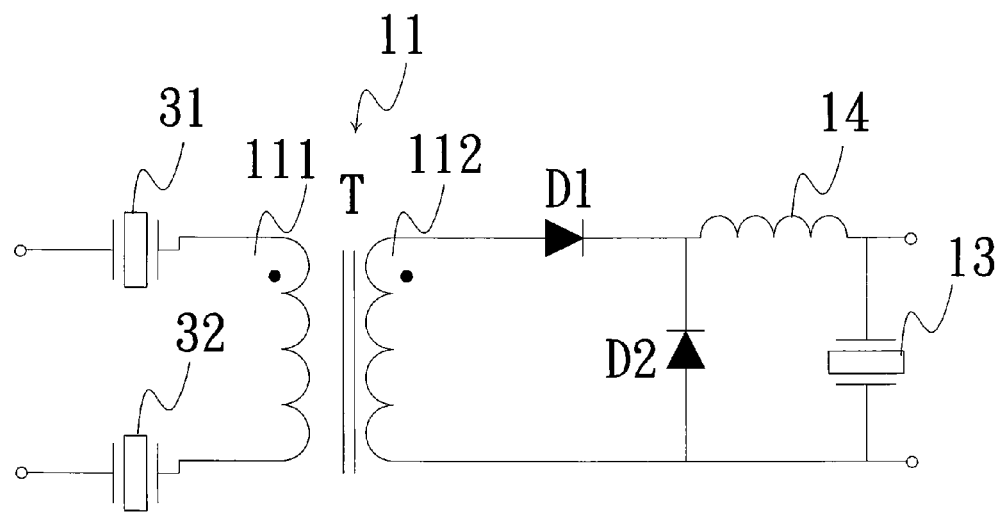
FIG. 3 is a schematic diagram of a piezoelectric power supply converter used in full-bridge input according to a second embodiment of the present invention.

Refer to FIGS. 1 & 3 at the same time. FIG. 3 is a schematic diagram of a piezoelectric power supply converter used in full-bridge input according to a second embodiment of the present invention. The structure and operation of the second embodiment is the same as those of the first embodiment in FIG. 1. Wherein, the similar parts will not be repeated here for brevity. However, the difference is that, in the second embodiment, two first piezoelectric elements are provided, and their intrinsic capacitance characteristics are utilized as a first piezoelectric-oscillator 31 and a second piezoelectric-oscillator 32, and they are located at the primary side 111 of transformer 11, and using the primary side of transformer 11 to form a full-bridge resonance circuit. Piezoelectric-oscillators 31 and 32 are located at two ends of the primary side 111. The first piezoelectric-oscillator 31 and the second piezoelectric-oscillator 32 are used to receive pulse voltage. When the resonance circuit resonances, the piezoelectric effect it produces is used to raise the capacitance and output it to the primary side 111, in this way, a raised power output can be achieved than utilizing a single piezoelectric-oscillator.

Figure 4:
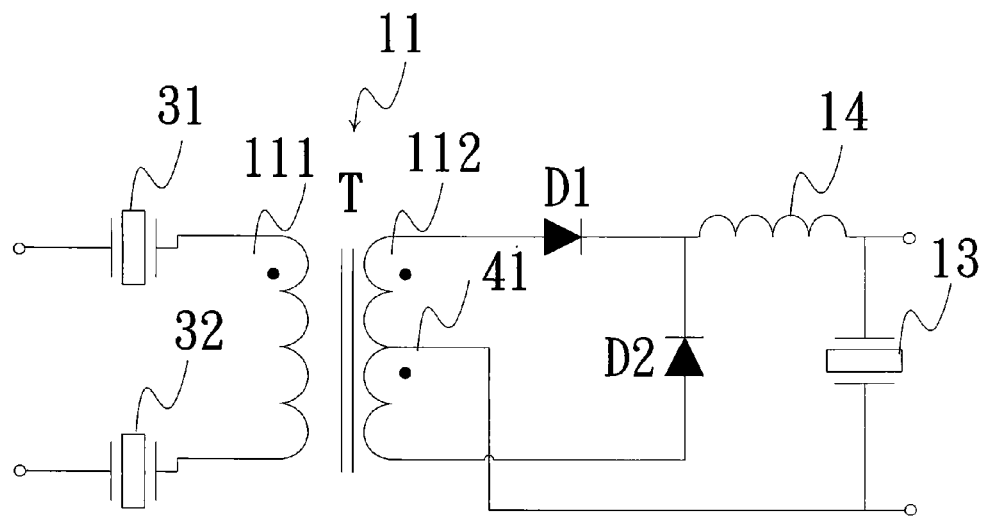
FIG. 4 is a schematic diagram of a piezoelectric power supply converter used in full-bridge input according to a third embodiment of the present invention.

Refer to FIGS. 3 & 4 at the same time. FIG. 4 is a schematic diagram of a piezoelectric power supply converter used in full-bridge input according to a third embodiment of the present invention. The structure and operation of the third embodiment is the same as those of the second embodiment in FIG. 3. Wherein, the similar parts will not be repeated here for brevity. However, the difference is that, in the third embodiment, at least a center tap 41 is provided in the transformer 11 and is located at the center of the secondary side 112, and the voltage differences from the center tap 41 to the two ends are equal.

When the input voltage is at its positive half cycle, then diode D1 is forward biased, thus current can flow from diode D1 to piezoelectric-capacitor 13 via a filter inductor 14 to proceed with charging of piezoelectric-capacitor 13, and then current will return to the center tap 41; however, at this time diode D2 is reverse biased, and it is in an equivalent open circuit state, thus there is no current flowing through. When the input voltage is at its negative half cycle, then diode D1 is reverse biased, thus there is no current flowing through, however, at this time diode D2 is forward biased, thus current can flow from diode D2 to the piezoelectric-capacitor 13 via the filter inductor 14 to proceed with charging of the piezoelectric-capacitor 13, and then current will return to the center tap 41, therefore, the polarity of voltage drop across piezoelectric-capacitor 13 in the negative half cycle is the same as that in the positive half cycle. Namely, it indicates that the currents flowing through piezoelectric-capacitor 13 are in the same direction. Then, piezoelectric-capacitor 13 is used to output DC voltage to an external load in performing the operations required.

Figure 5:
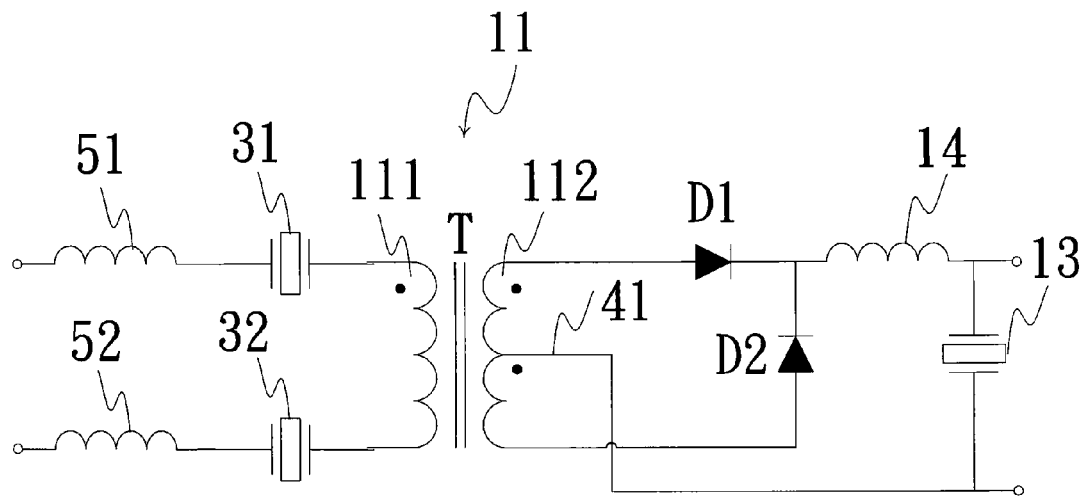
FIG. 5 is a schematic diagram of a piezoelectric power supply converter used in full-bridge input according to a fourth embodiment of the present invention.
Figure 6:
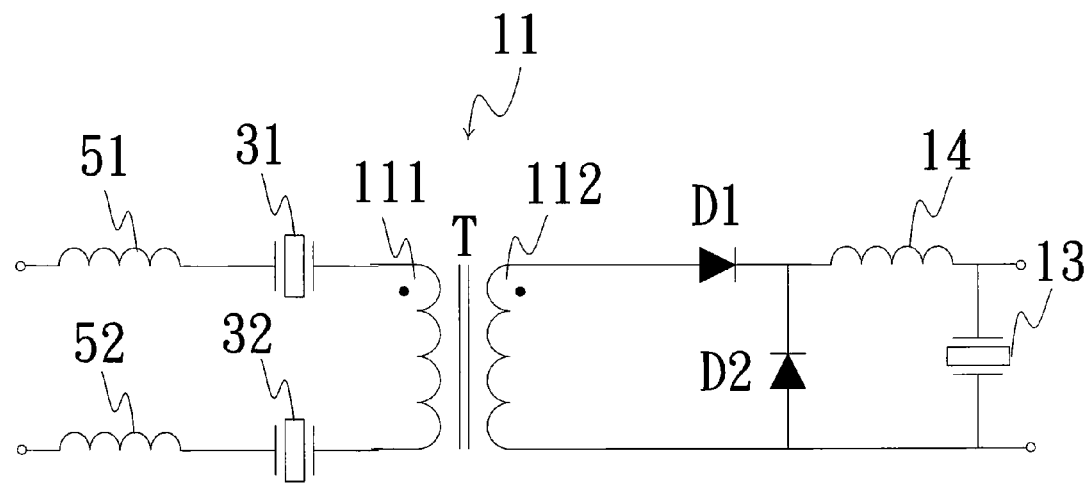
FIG. 6 is a schematic diagram of a piezoelectric power supply converter used in full-bridge input according to a fifth embodiment of the present invention.

Refer to FIGS. 4 & 5 at the same time. FIG. 5 is a schematic diagram of a piezoelectric power supply converter used in full-bridge input according to a fourth embodiment of the present invention. The structure and operation of the fourth embodiment is the same as those of the third embodiment in FIG. 4. Wherein, the similar parts will not be repeated here for brevity. However, the difference is that, in the fourth embodiment, a first resonance inductor 51 and a second resonance inductor 52 are provided and are connected in series respectively with the first piezoelectric-oscillator 31 and the second piezoelectric-oscillator 32, hereby forming a full-bridge resonance circuit located on the primary side 111 of the transformer 11. The first piezoelectric-oscillator 31 and the second piezoelectric-oscillator 32 are used to receive pulse voltage through the first resonance inductor 51 and a second resonance inductor 52 respectively. Since first resonance inductor 51 and a second resonance inductor 52 have energy storage capability, therefore it can provide higher voltage to the first piezoelectric-oscillator 31 and the second piezoelectric-oscillator 32. When the resonance circuit resonances, the piezoelectric effect it produces is used to raise the capacitance, and it is output to the primary side 111, and that is used to provide larger output power to an outside load in performing the operations required. In addition, the transformer 11 can be designed to be without having a center tap, refer to FIG. 6 for a schematic diagram of a piezoelectric power supply converter used in full-bridge input according to a fifth embodiment of the present invention. As shown in FIG. 6, two ends of the secondary side 112 of a transformer 11 are connected respectively to diodes D1 and D2, that are used to transform AC voltage into DC voltage, Then, piezoelectric-capacitor 13 is used to output DC voltage to an external load in performing the operations required.

Figure 7:
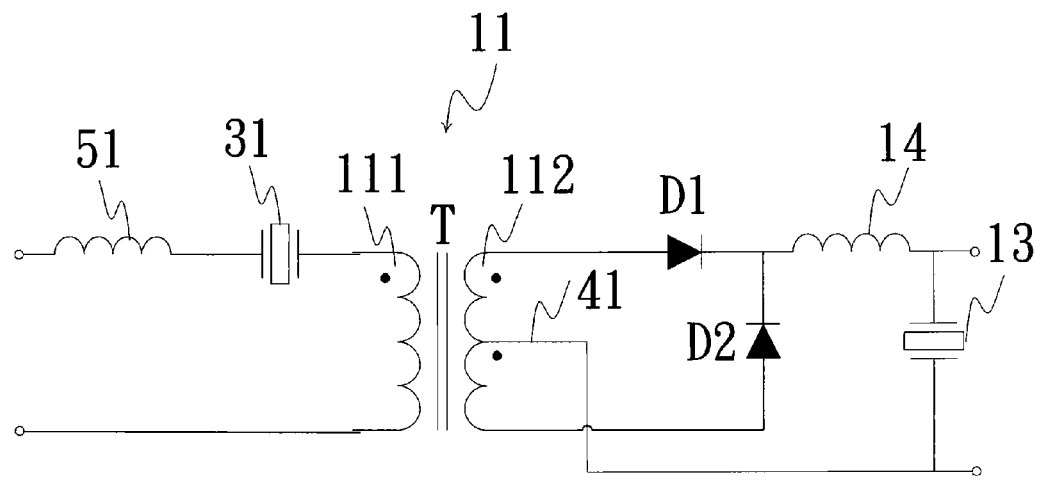
FIG. 7 is a schematic diagram of a piezoelectric power supply converter used in half-bridge input according to a sixth embodiment of the present invention.
Figure 8:
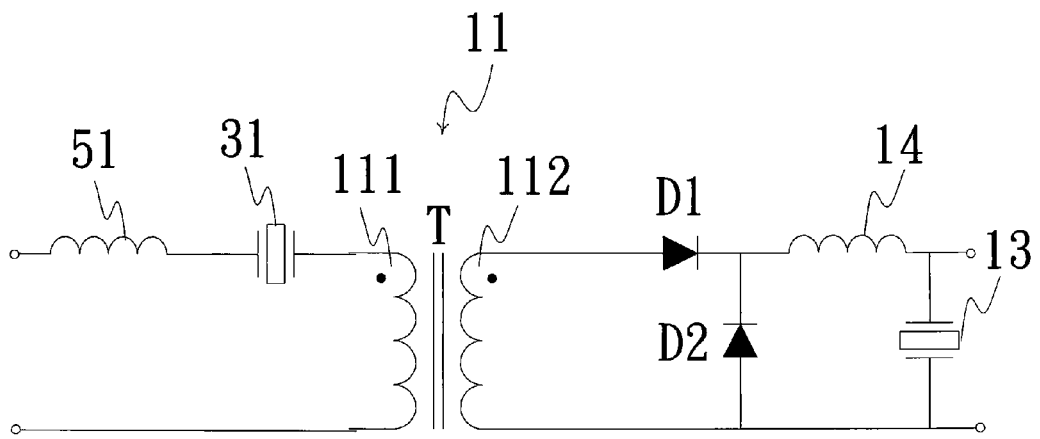
FIG. 8 is a schematic diagram of a piezoelectric power supply converter used in half-bridge input according to a seventh embodiment of the present invention.

Refer to FIGS. 5 & 7 at the same time. FIG. 7 is a schematic diagram of a piezoelectric power supply converter used in full-bridge input according to a sixth embodiment of the present invention. The structure and operation of the sixth embodiment is the same as those of the fifth embodiment in FIG. 6. Wherein, the similar parts will not be repeated here for brevity. However, the difference is that, in the sixth embodiment, a resonance inductor 51 is connected to a piezoelectric-oscillator 31 in series to form a half-bridge resonance circuit, and that is located on a primary side 111 of a transformer 11. When the resonance circuit resonances, the piezoelectric effect it produces is used to raise the capacitance, and it is output to the primary side 111, and that is used to provide smaller output power to an outside load in performing the operations required. In addition, the transformer 11 can be designed to be without having a center tap. Refer to FIG. 8 for a schematic diagram of a piezoelectric power supply converter used in half-bridge input according to a seventh embodiment of the present invention. As shown in FIG. 8, two ends of the secondary side 112 of a transformer 11 are connected respectively to diodes D1 and D2, that are used to transform AC voltage into DC voltage. Then, piezoelectric-capacitor 13 is used to output a DC voltage to an external load in performing the operations required.

Figure 9:
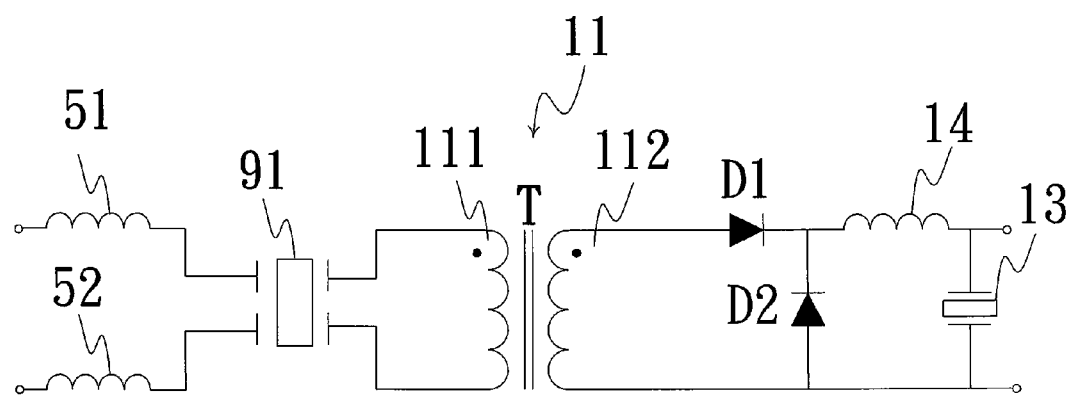
FIG. 9 is a schematic diagram of a piezoelectric power supply converter used in full-bridge input according to an eighth embodiment of the present invention.
Figure 10A:
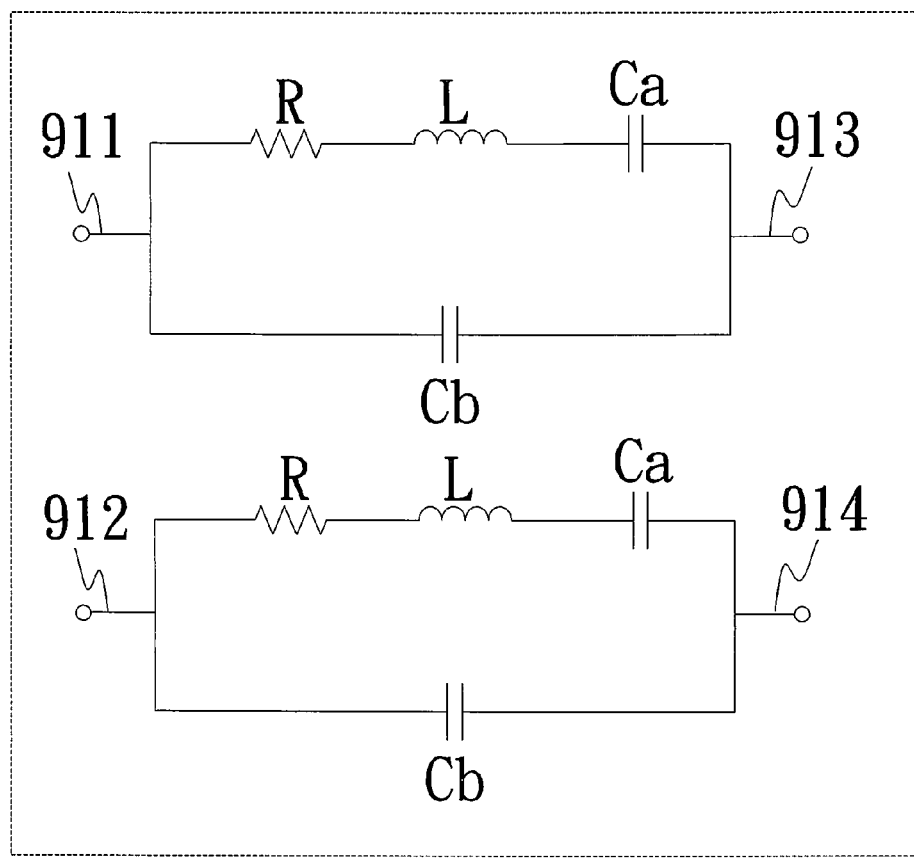
FIG. 10(A) is an equivalent circuit of an insulating piezoelectric-oscillator according to an embodiment of the present invention.

Refer to FIGS. 6 & 9 at the same time. FIG. 9 is a schematic diagram of a piezoelectric power supply converter used in full-bridge input according to an eighth embodiment of the present invention. The structure and operation of the eighth embodiment is the same as those of the seventh embodiment in FIG. 6. Wherein, the similar parts will not be repeated here for brevity. However, the difference is that, in the eighth embodiment, the first piezoelectric-oscillator 31 and the second piezoelectric-oscillator 32 in FIG. 6 are merged into an insulating piezoelectric-oscillator 91 for replacement. Of course, more piezoelectric-oscillators can be merged to form an insulating piezoelectric-oscillator 91 depending on actual requirements. Refer to FIG. 10A for an equivalent circuit of an insulating piezoelectric-oscillator 91 according to an embodiment of the present invention, which is realized through merging two equivalent circuits as shown in FIG. 2(B), and as such, produce a first input terminal 911, a second input terminal 912, a first output terminal 913, and a second output terminal 914.

Figure 10B:
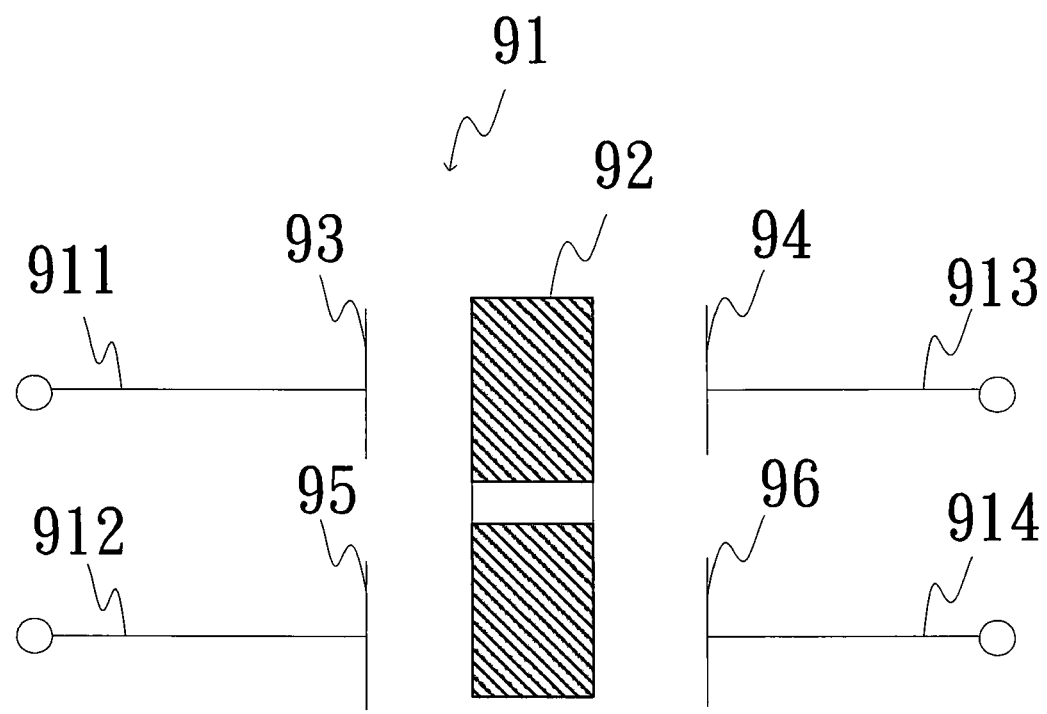
FIG. 10(B) is cross section view of an insulating piezoelectric-oscillator according to an embodiment of the present invention.

Subsequently, refer to FIG. 10(B) for a cross section view of an insulating piezoelectric-oscillator according to an embodiment of the present invention. As shown in FIG. 10(B), the insulating piezoelectric-oscillator 91 comprises: a substrate 92, at least a first upper electrode 93, at least a first lower electrode 94, at least a second upper electrode 95, at least a second lower electrode 96. The substrate 92 is made of ceramic material, and having an upper surface and a lower surface. The first upper electrode 93 is disposed on the upper surface of the substrate 92, and the first lower electrode 94 is disposed on the lower surface of the substrate 92, and is corresponding to the first upper electrode 93. The first input terminal 911 is used to receive a pulse voltage and transmits it to the first upper electrode 93, and the capacitance is raised through an internal piezoelectric effect, then it is output from the first lower electrode 94, and that is connected to the first output terminal 913. In other words, the second input terminal 912 is used to receive a pulse voltage, and transmit it to the second upper electrode 95 disposed on the upper surface of the substrate 92, and the second lower electrode 96 is disposed on the lower surface of the substrate 92, and is corresponding to the second upper electrode 95. The second input terminal 912 is used to receive a pulse voltage and transmits it to the second upper electrode 95, and the capacitance is raised through an internal piezoelectric effect, then it is output from the second lower electrode 96, and that is connected to the second output terminal 914. Since the substrate between the first upper and lower electrodes 93 and 94, and the substrate between the second upper and lower electrodes 95 and 96 are applied AC voltage and are polarized respectively, thus they have positive polarity and negative polarity after polarization, and the center not polarized portion still keep its property of ceramic material, thus it does not have polarity, and when AC voltage passes through, it will indicate insulation state. Subsequently, in the present embodiment, a first resonance inductor 51 and a second resonance inductor 52 are connected respectively to a first input terminal 911 and a second input terminal 912 of an insulating piezoelectric-oscillator 91, hereby forming a full-bridge resonance circuit, and is located on a primary side 111 of a transformer 11. Wherein, when the resonance circuit resonances, the first input terminal 911 and the second input terminal 912 of the insulating piezoelectric-oscillator 91 will be connected to the first resonance inductor 51 and the second resonance inductor 52, hereby producing piezoelectric effect and raising the capacitance. The first output terminal 913 and the second output terminal 914 of the insulating piezoelectric-oscillator 91 are connected to the two ends of the primary side 111, so that the primary side 111 is provided with high AC voltage through piezoelectric conversion, thus providing higher output power to an external load in performing the operations required.

Figure 11:
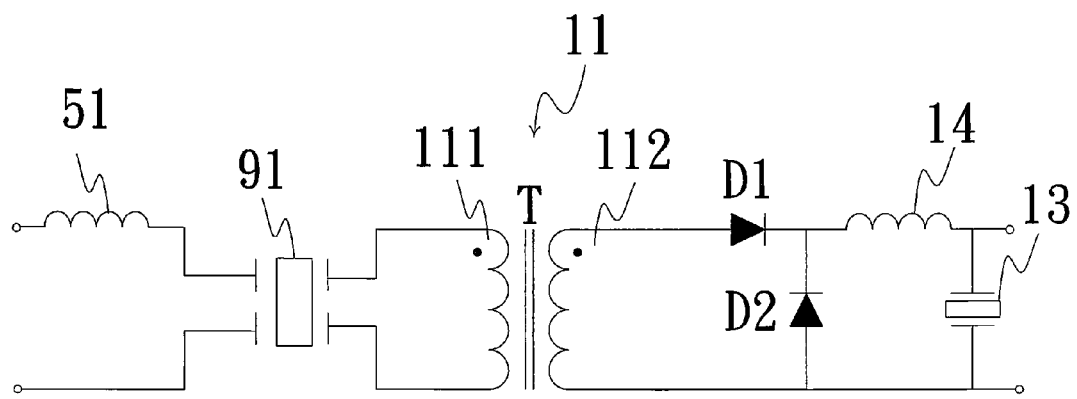
FIG. 11 is schematic diagram of a piezoelectric power supply converter used in half-bridge input according to a ninth embodiment of the present invention.

Moreover, refer to FIG. 11 for a schematic diagram of a piezoelectric power supply converter used in half-bridge input according to a ninth embodiment of the present invention, wherein, a first resonance inductor 51 is connected to a an insulating piezoelectric-oscillator 91, hereby forming a full-bridge resonance circuit, and is located on a primary side 111 of a transformer 11. Wherein, when the resonance circuit resonances, the insulating piezoelectric-oscillator 91 is made to produce the piezoelectric effect to raise the capacitance and output it to the primary side 111, and that is used to provide a smaller output power to an outside load in performing the operations required.

In the embodiments mentioned above, only one voltage output to an outside load is designed in performing the operations required, in case that the input voltage signal is much more larger, then more than two outputs can be designed. In other words, more than two center taps must be provided in cooperation with more than two filter-rectifier circuits, so as to provide more than two voltage outputs to an outside load in performing the operations required.

Figure 12:
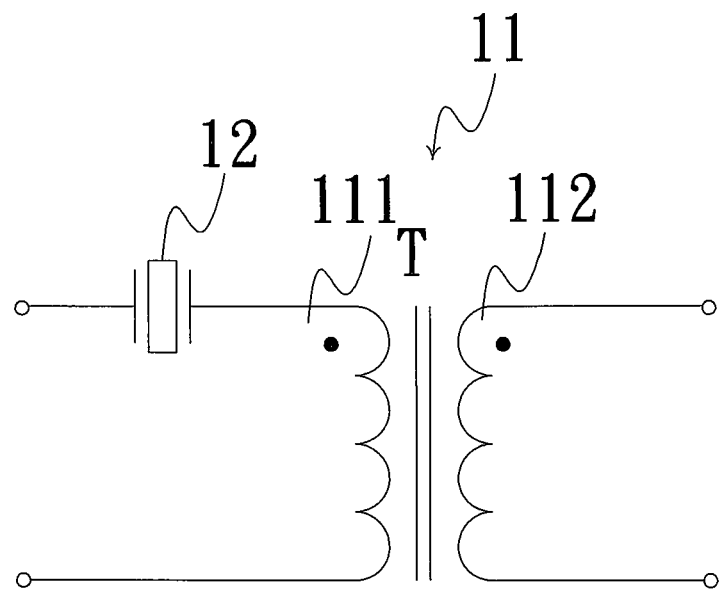
FIG. 12 is a schematic diagram of a half-bridge AC to AC piezoelectric power supply converter according to a ten embodiment of the present invention.

Refer to FIG. 12 for a schematic diagram of a half-bridge AC-to-AC piezoelectric power supply converter according to a tenth embodiment of the present invention. The difference between the tenth embodiment and the first embodiment of FIG. 1 is that, the present embodiment is utilized in an AC-to-AC power supply converter; while the first embodiment in FIG. 1 is utilized in an AC-to-DC power supply converter. Therefore, in the present embodiment, the secondary side 112 of transformer 11 does not have to be provided with an output filter-rectifier circuit in converting an AC voltage into a DC voltage. The AC-to-AC piezoelectric power supply converter includes: a transformer 11 and at least a first piezoelectric element. Wherein, in the present embodiment, the transformer 11 is provided with a primary side 111 and a secondary side 112. The primary side of the transformer 11 is utilized as an inductor, and it is connected in series with the first piezoelectric element to form a half-bridge resonance circuit; while the intrinsic capacitance of the first piezoelectric element is utilized as piezoelectric-oscillator 12, and that is used to replace a capacitor in a conventional power supply converter. Wherein, the structure and equivalence circuit of the piezoelectric-oscillator 12 disclosed in the present embodiment are as shown in FIGS. 2(A) & 2(B). In the present embodiment, the primary side 111 of the transformer 11 is used as an inductor to form a half-bridge resonance circuit. As such, when the resonance circuit resonances, the piezoelectric-oscillator 12 is used to store electric energy and having piezoelectric characteristics, thus being able to adjust power factor and then output the power thus obtained. For the piezoelectric-oscillator 12, when it is applied a voltage it will deform to produce a reverse piezoelectric effect, while after deformation, it will produce a forward piezoelectric effect, and the conversion between forward and reverse piezoelectric effects will produce positive charges, thus amplifying the voltage and realizing the result of amplifying the voltage, hereby achieving the effect of large power output. Wherein, the capacitance of mechanical characteristic Cb of the equivalent capacitor in the equivalent circuit is about three times as that of its electric characteristic Ca. Then by adding the capacitance of Ca and Cb, such that piezoelectric-oscillator 12 could have high capacitance (Q=C*V), therefore, it is capable of providing increased output power of several folds, thus raising the energy conversion efficiency.

Figure 13:
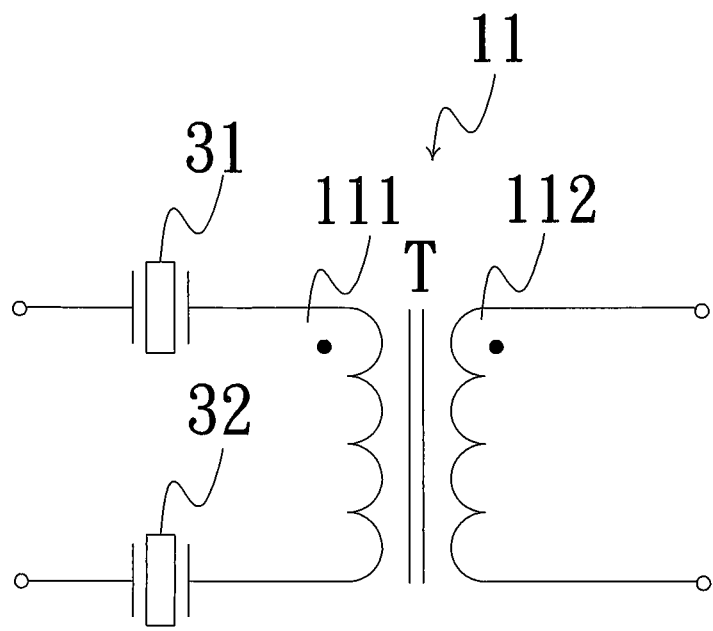
FIG. 13 is a schematic diagram of a piezoelectric power supply converter used in full-bridge input according to an eleventh embodiment of the present invention.

Refer to FIGS. 12 & 13 at the same time. FIG. 13 is a schematic diagram of a piezoelectric power supply converter used in full-bridge input according to an eleventh embodiment of the present invention. The structure and operation of the eleventh embodiment is the same as those of the tenth embodiment in FIG. 12. Wherein, the similar parts will not be repeated here for brevity. However, the difference is that, in the eleventh embodiment, two first piezoelectric elements are provided, the intrinsic capacitance of the first piezoelectric element is utilized as a first piezoelectric-oscillator 31 and a second piezoelectric-oscillator 32, and that are located on the primary side 111 of the transformer 11, the primary side of the transformer 11 is utilized as an inductor to form a full-bridge resonance circuit. The first piezoelectric-oscillator 31 and the second piezoelectric-oscillator 32 are connected respectively to both ends of the primary side 111, and the first piezoelectric-oscillator 31 and the second piezoelectric-oscillator 32 are utilized to receive pulse voltage. When the resonance circuit resonances, the piezoelectric effect it produces is used to raise the capacitance, and it is output to the primary side 111, thus being able to raise the output power further than using only a single piezoelectric-oscillator.

Figure 14:
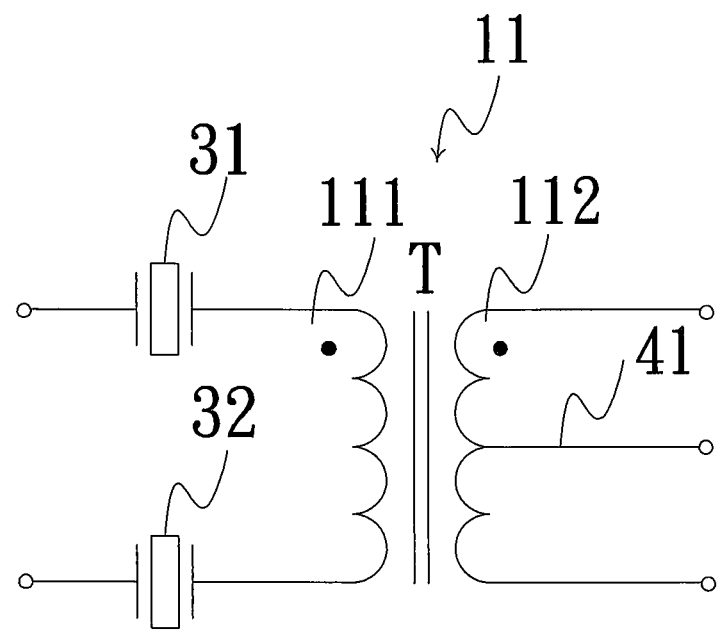
FIG. 14 is a schematic diagram of a piezoelectric power supply converter used in full-bridge input according to a twelfth embodiment of the present invention.

Refer to FIGS. 13 & 14 at the same time. FIG. 14 is a schematic diagram of a piezoelectric power supply converter used in full-bridge input according to a twelfth embodiment of the present invention. The structure and operation of the twelfth embodiment is the same as those of the eleventh embodiment in FIG. 13. Wherein, the similar parts will not be repeated here for brevity. However, the difference is that, at least a center tap 41 is provided in the transformer 11, and that is located in the center of the secondary side 112, such that the voltage differences to the two ends of the secondary side are equal, hereby producing two sets of output voltages, that are used to provide an outside load with a greater output power. In addition, refer to FIG. 15 for a schematic diagram of a piezoelectric power supply converter used in half-bridge input according to a thirteenth embodiment of the present invention. Wherein, at least a center tap 41 is provided in the transformer 11, and that is located in the center of the secondary side 112, such that the voltage differences to the two ends of the secondary side are equal, hereby producing two sets of output voltages, that are used to provide an outside load with a smaller output power.

Figure 16:
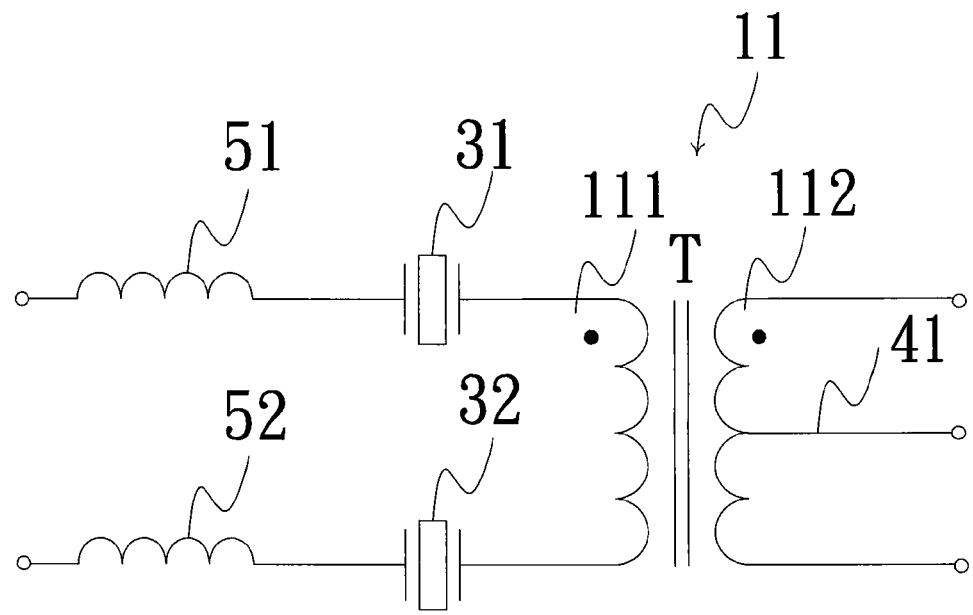
FIG. 16 is a schematic diagram of a piezoelectric power supply converter used in full-bridge input according to a fourteenth embodiment of the present invention.
Figure 17:
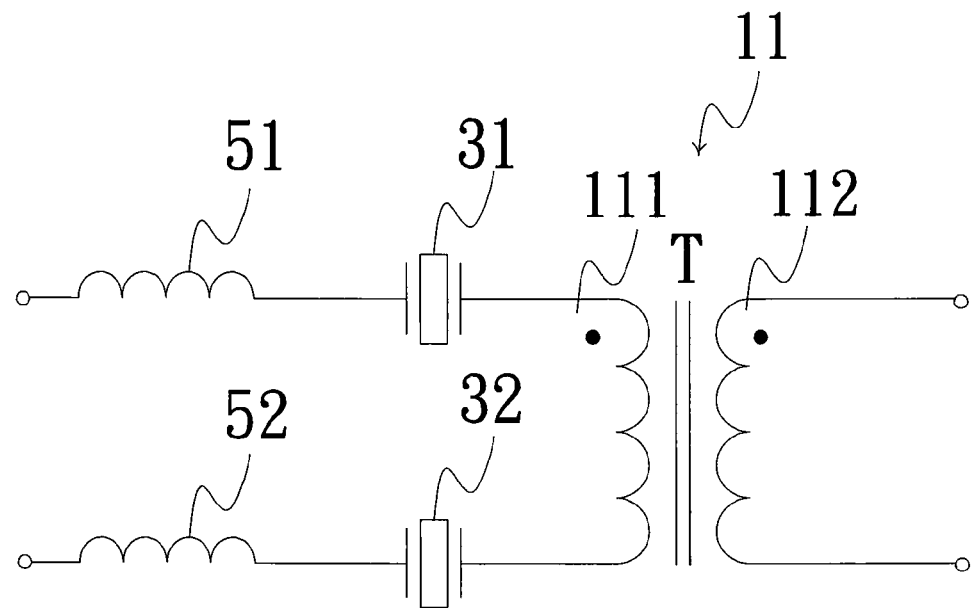
FIG. 17 is a schematic diagram of a piezoelectric power supply converter used in full-bridge input according to a fifteenth embodiment of the present invention.

Refer to FIGS. 14 & 16 at the same time. FIG. 16 is a schematic diagram of a piezoelectric power supply converter used in full-bridge input according to a fourteenth embodiment of the present invention. The structure and operation of the fourteenth embodiment is the same as those of the twelfth embodiment in FIG. 14. Wherein, the similar parts will not be repeated here for brevity. However, the difference is that: in the fourteenth embodiment, a first resonance inductor 51 and a second resonance inductor 52 are provided, that correspond respectively to the first piezoelectric-oscillator 31 and the second piezoelectric-oscillator 32 connected in series, hereby forming a full-bridge resonance circuit on the primary side 111 of the transformer 11. The first piezoelectric-oscillator 31 and the second piezoelectric-oscillator 32 are used to receive pulse voltage through the first resonance inductor 51 and the second resonance inductor 52 respectively. Since first resonance inductor 51 and a second resonance inductor 52 have energy storage capability, therefore it can provide higher voltage to the first piezoelectric-oscillator 31 and the second piezoelectric-oscillator 32. When the resonance circuit resonances, the piezoelectric effect it produces is used to raise the capacitance and it is output to the primary side 111, and that is used to provide larger output power to an outside load in performing the operations required. In addition, the transformer 11 can be designed to be without having a center tap, refer to FIG. 17 for a schematic diagram of a piezoelectric power supply converter used in full-bridge input according to a fifteenth embodiment of the present invention. As shown in FIG. 17, the primary side 111 of a transformer 11 is used to induce the secondary side 112, and AC voltage is output from the secondary side 112, that are used to provide an outside load with a larger output power in performing the operations required.

Figure 15:
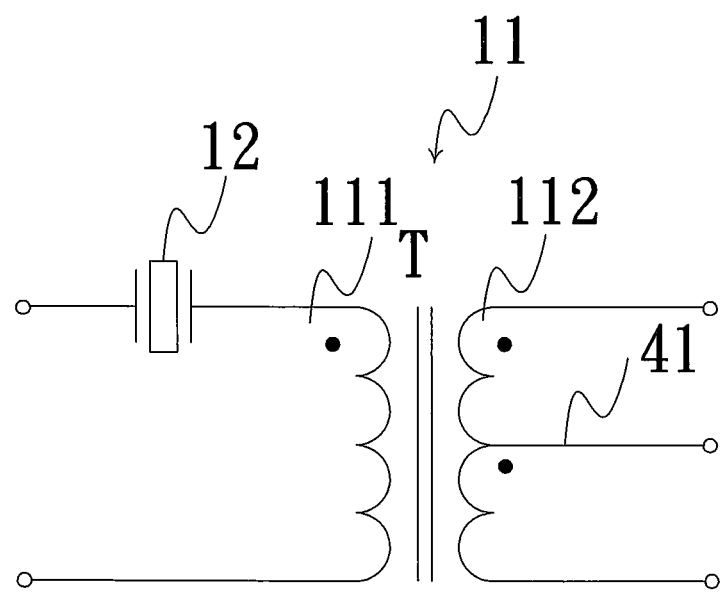
FIG. 15 is a schematic diagram of a piezoelectric power supply converter used in full-bridge input according to a thirteenth embodiment of the present invention.
Figure 18:
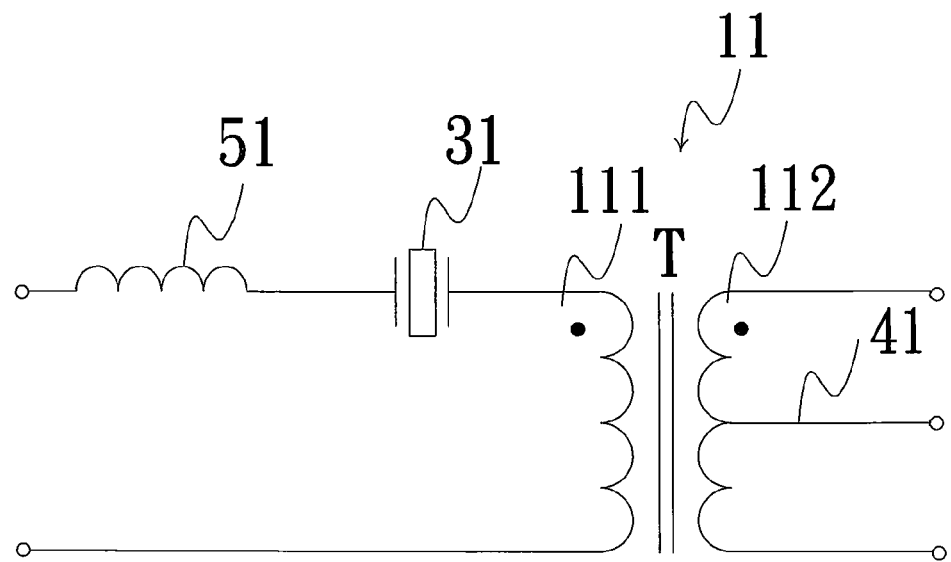
FIG. 18 is a schematic diagram of a piezoelectric power supply converter used in half-bridge input according to a sixteenth embodiment of the present invention.
Figure 19:
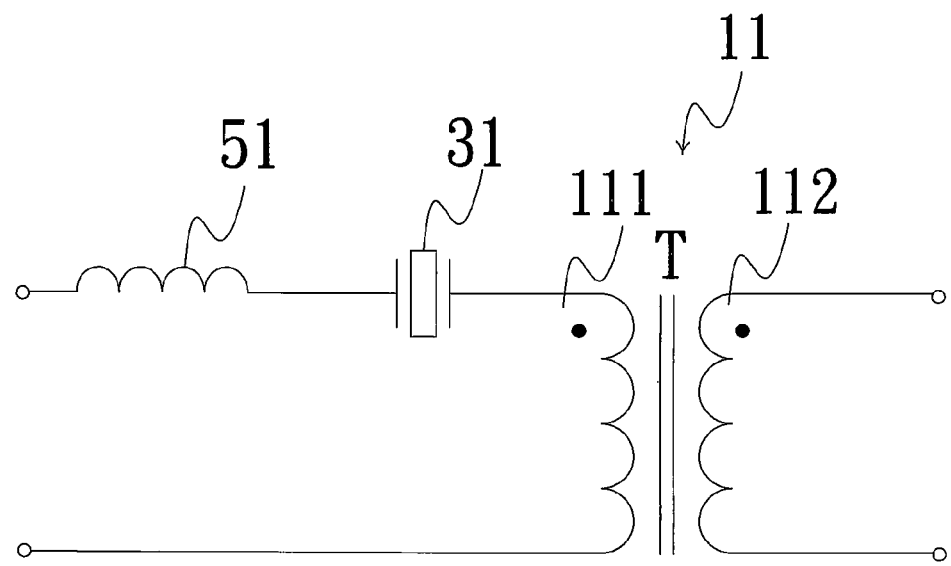
FIG. 19 is a schematic diagram of a piezoelectric power supply converter used in half-bridge input according to a seventeenth embodiment of the present invention.

Refer to FIGS. 15 & 18 at the same time. FIG. 18 is a schematic diagram of a piezoelectric power supply converter used in full-bridge input according to a sixteenth embodiment of the present invention. The structure and operation of the sixteenth embodiment is the same as those of the thirteenth embodiment in FIG. 15. Wherein, the similar parts will not be repeated here for brevity. However, the difference is that: in the sixth embodiment, a resonance inductor 51 is connected to a piezoelectric-oscillator 31 in series to form a half-bridge resonance circuit on a primary side 111 of a transformer 11. When the resonance circuit resonances, the piezoelectric effect it produces is used to raise the capacitance, and it is output to the primary side 111, and that is used to provide smaller output power to an outside load in performing the operations required. In addition, the transformer 11 can be designed to be without having a center tap. Refer to FIG. 19 for a schematic diagram of a piezoelectric power supply converter used in half-bridge input according to a seventeenth embodiment of the present invention. As shown in FIG. 19, the primary side 111 of a transformer 11 is used to induce the secondary side 112, and AC voltage is output from the secondary side 112, that are used to provide an outside load with a larger output power in performing the operations required.

In the embodiments mentioned above, only one voltage output to an outside load is designed in performing the operations required, in case that the input voltage signal is much more larger, then more than two outputs can be designed. In other words, more than two center taps are required, so as to provide more than two voltage outputs to an outside load in performing the operations required.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A piezoelectric power supply converter, comprising:
a transformer, provided with a primary side and a secondary side;

at least a first piezoelectric element, with its one end connected to said primary side, and an other end is used to receive a pulse voltage and output to said primary side; and at least a second piezoelectric element, located on said secondary side, and is used to output a DC voltage to an outside load in performing operations required;

wherein said transformer is provided with at least a center tap, located at a center of said secondary side, such that voltage differences to both ends of said secondary side are equal.

2. The piezoelectric power supply converter as claimed in claim 1, wherein said second piezoelectric element is a piezoelectric-capacitor.

3. The piezoelectric power supply converter as claimed in claim 2, wherein an equivalent circuit of said piezoelectric-capacitor includes an equivalent resistor R, an equivalent inductor L, and an equivalent capacitor Ca, and a static capacitor Cb, and said equivalent capacitance of said piezoelectric-capacitor is expressed as:

$$Ca/(1-\omega^2*Ca*L)+Cb$$

wherein, $\omega$ is an operation frequency (rad/s).

4. The piezoelectric power supply converter as claimed in claim 1, wherein said first piezoelectric element is a piezoelectric-oscillator or an insulating piezoelectric oscillator.

5. The piezoelectric power supply converter as claimed in claim 4, wherein said equivalent circuit of said piezoelectric-oscillator includes said equivalent resistor R, said equivalent inductor L, said equivalent capacitor Ca, and a static capacitor Cb, and said equivalent capacitance of said piezoelectric-oscillator is expressed as:

$$Ca/(1-\omega^2*Ca*L)+Cb$$

wherein, $\omega$ is an operation frequency (rad/s).

6. The piezoelectric power supply converter as claimed in claim 1, further comprising:

a resonance inductor, connected in series with said first piezoelectric element to form a half-bridge resonance circuit, and is located on said primary side of said transformer.

7. The piezoelectric power supply converter as claimed in claim 6, further comprising:

two said resonance inductors, connected in series correspondingly with two said first piezoelectric elements respectively to form a full-bridge resonance circuit, and that is located on said primary side of said transformer.

8. The piezoelectric power supply converter as claimed in claim 7, wherein said full-bridge resonance circuit comprises two said resonance inductors and two said first piezoelectric elements, and two said resonance inductors are connected in series respectively with two said first piezoelectric elements.

9. The piezoelectric power supply converter as claimed in claim 1, further comprising:

two diodes and a filter inductor, one end of said filter inductor is connected to said two diodes, and said other end is connected to said second piezoelectric element to form a filter-rectifier circuit, and that is located on said secondary side of said transformer.

\* \* \* \* \*